United States Patent
Mack et al.

(10) Patent No.: US 10,683,904 B2
(45) Date of Patent: Jun. 16, 2020

(54) DISC BRAKE, IN PARTICULAR FOR A COMMERCIAL VEHICLE

(71) Applicant: KNORR-BREMSE Systeme fuer Nutzfahrzeuge GmbH, Munich (DE)

(72) Inventors: Martin Mack, Munich (DE); Alf Siebke, Schondorf am Ammersee (DE); Markus Gruber, Ebersberg (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 15/726,744

(22) Filed: Oct. 6, 2017

(65) Prior Publication Data

US 2018/0031064 A1    Feb. 1, 2018

Related U.S. Application Data

(63) Continuation of application No. PCT/EP2016/057605, filed on Apr. 7, 2016.

(30) Foreign Application Priority Data

Apr. 9, 2015 (DE) ......... 10 2015 105 350

(51) Int. Cl.
  *F16D 66/02* (2006.01)
  *F16D 65/00* (2006.01)
  (Continued)

(52) U.S. Cl.
  CPC ......... *F16D 66/02* (2013.01); *F16D 65/0043* (2013.01); *F16D 65/0068* (2013.01);
  (Continued)

(58) Field of Classification Search
  CPC ...... F16D 66/02; F16D 66/022; F16D 66/026; F16D 66/028
  See application file for complete search history.

(56) References Cited

U.S. PATENT DOCUMENTS 3,385,256 A * 5/1968 Forbush ............... F16D 66/02
                                                            116/208
2007/0107994 A1   5/2007 McClellan
(Continued)

FOREIGN PATENT DOCUMENTS

CN    101782107 A    7/2010
CN    104747635 A    7/2015
(Continued)

OTHER PUBLICATIONS

International Preliminary Report on Patentability (PCT/IB/373) issued in PCT Application No. PCT/EP2016/057605 dated Oct. 10, 2017, including English translation of document C2 (German-language Written Opinion (PCT/ISA/237)) previously filed on Oct. 6, 2017 (seven pages).

(Continued)

*Primary Examiner* — Melanie Torres Williams
(74) *Attorney, Agent, or Firm* — Crowell & Moring LLP

(57) ABSTRACT

A disc brake, in particular for a commercial vehicle, has functional components that can be reused after use and subsequent examination for operational safety. The disc brake is designed in such a way that at least each of the safety-relevant functional components is equipped with at least one indicator, the operation-related service life of which is less than the safety-relevant ranges of the functional components.

8 Claims, 2 Drawing Sheets

(51) Int. Cl.
*F16D 65/18* (2006.01)
*F16D 55/00* (2006.01)
*F16D 121/14* (2012.01)
*F16D 125/28* (2012.01)

(52) U.S. Cl.
CPC ........... *F16D 65/18* (2013.01); *F16D 66/028* (2013.01); *F16D 2055/0016* (2013.01); *F16D 2121/14* (2013.01); *F16D 2125/28* (2013.01); *F16D 2250/0007* (2013.01); *G01N 2203/0664* (2013.01)

(56) References Cited

U.S. PATENT DOCUMENTS

| | | |
|---|---|---|
| 2008/0047787 A1 | 2/2008 | Scheckelhoff et al. |
| 2013/0174656 A1* | 7/2013 | MacKelvie ........... F16D 65/092 73/121 |
| 2013/0220210 A1 | 8/2013 | Malki et al. |
| 2013/0299284 A1 | 11/2013 | Lange et al. |

FOREIGN PATENT DOCUMENTS

| | | | |
|---|---|---|---|
| DE | 10 2011 000 425 A1 | 8/2012 | |
| EP | 2149721 A1 * | 2/2010 | ............. F16D 66/02 |
| EP | 2 634 446 A1 | 9/2013 | |

OTHER PUBLICATIONS

International Search Report (PCT/ISA/210) issued in PCT Application No. PCT/EP2016/057605 dated Jun. 16, 2016 with English translation (six pages).

German-language Written Opinion (PCT/ISA/237) issued in PCT Application No. PCT/EP2016/057605 dated Jun. 16, 2016 (four pages).

Chinese-language Office Action issued in counterpart Chinese Application No. 201680025131.2 dated Sep. 21, 2018 with English translation (nine pages).

* cited by examiner

DISC BRAKE, IN PARTICULAR FOR A COMMERCIAL VEHICLE

CROSS REFERENCE TO RELATED APPLICATIONS

This application is a continuation of PCT International Application No. PCT/EP2016/057605, filed Apr. 7, 2016, which claims priority under 35 U.S.C. § 119 from German Patent Application No. 10 2015 105 350.0, filed Apr. 9, 2015, the entire disclosures of which are herein expressly incorporated by reference.

BACKGROUND AND SUMMARY OF THE INVENTION

The invention relates to a disc brake, in particular for a commercial vehicle, having functional components which can be reused after use and subsequent examination for operational safety.

It is known to reuse, that is to say again install in a commercial vehicle, disc brakes which have been removed within the scope of maintenance work, i.e. removed from the commercial vehicle after inspection of the functional components and, if appropriate, their replacement or refurbishment.

Reusing functional components of the disc brake permits the high material value and fabrication expenditure of the components to be largely utilized, which provides a cost-effective alternative to newly fabricated functional components.

However, the use of such used functional components is problematic insofar as it has hitherto not been possible to detect whether the respective functional component in its further use will sufficiently withstand the operational loading over a predefined service life. That is to say, the functioning and reliability of the refurbished disc brake must not be adversely affected by possible deficiencies of the reused components.

In fact, given a series of functional components of the disc brake, it is not possible to detect what stresses this functional component, for example the brake caliper, was subjected to until its removal.

Moreover, many functional components are configured according to fatigue strength criteria, which results in a service life of a defined limited length.

In particular, as mentioned, for reasons of economy but also in order to save resources, there is a requirement to use the maximum functional components of a used brake for a reworked product. For this purpose, a high level of reliability of the evaluation of the components is necessary, not least for reasons of guarantee and product liability.

It is known to reuse assemblies from other fields in the prior art, said reuse usually being preceded by the following steps:
  return and collection of used, discarded functional components,
  if appropriate separating out of unsuitable functional components (e.g. heavily damaged ones),
  identification of the type of equipment and version,
  cleaning of the assembly,
  removal of the functional components,
  cleaning and inspection of the functional components,
  if appropriate classification according to defined criteria (e.g. wear limits),
  if appropriate reworking of functional components,
  mounting of equipment with reused (if appropriate reworked) and, where necessary, new components,
  functional checking, and characterization as a reworked product.

The step "selection of reusable functional components", which requires reliable assessment with respect to the remaining service life of the functional component which can be expected, is critical here.

This assessment is made according to various criteria such as damage, deformation, corrosion and wear, which are examined visually or with aids (e.g. measurement, X-rays, fracture detection, etc.). This permits the functional components with clear damage to be identified and separated out.

Alternatively, if possible, these functional components can be fed to means for reworking, e.g. by way of mechanical subsequent machining, surface treatment or the like, and subsequently reused.

In contrast, it is not possible to determine or estimate the remaining usable service life of such functional components which do not exhibit any of the abovementioned detectable features.

Whereas, owing to safety considerations, it is obvious to exchange low-value components for a new component instead of reusing them, this constitutes a decisive economic problem for components which involve a high expenditure of material or fabrication expenditure.

The brake caliper of a disc brake, for example, forms such a large proportion of the total manufacturing costs of the disc brake that replacement by a new part would make reworking the respective disc brake uneconomic overall.

The described customary method for selecting reusable functional components is based essentially on empirical values. Used components without obvious damage features can be reused in this context without there being reliable decision criteria for their remaining service life, which can result in risks for the user and manufacturer. In particular, such a procedure is not acceptable for safety-relevant functional components.

Similarly, the use of a modified technical specification for reworked assemblies, which specification permits a reduced service life compared to a new assembly, does not entail the abovementioned problems. The functioning of a used functional component with an unknown remaining service life likewise cannot be ensured for such restricted requirements.

The results of product-accompanying trials with individual reworked disc brakes according to a reduced specification likewise do not permit conclusions to be drawn about the remaining service lives of other reworked brakes, since the remaining service life for each of the disc brakes in question is specific and can vary greatly depending on the state of the used components.

In order to estimate the utilization rate of the fatigue strength of, for example, a brake caliper, generally loading-relevant values are required and stored separately. However, this is possible only with considerable financial outlay and, moreover, constitutes a solution which is susceptible to faults.

The invention is based on the object of developing a disc brake of the generic type in such a way that reusability after use becomes reliably possible, in particular with respect to safety-relevant functional components.

Accordingly, at least the safety-relevant functional components are each equipped with an indicator which is distinguished, in terms of the loading, by a service life which is shorter, for operational reasons, than the safety-relevant ranges of the respective functional component.

In this context, this indicator is embodied in such a way that detectable damage occurs if the remaining service life of the functional component is not sufficient in order to permit reuse with the necessary operational safety.

Safety-relevant functional components which are provided with such an indicator are considered to be, for example, the brake caliper, a brake lever or a bridge. When braking occurs, the bridge is pressed by way of the brake lever against a brake pad which is in turn pressed against a vehicle-side brake disc.

The brake lever can be pivoted by use of roller bearings which are supported on the bridge or on the brake caliper.

According to a further aspect of the invention, the indicator can be embodied as a fin or web, wherein a plurality of such fins can be provided on the respective functional components.

The brake lever, like the brake caliper and the bridge, is usually manufactured as a cast part, with the result that it is appropriate here to integrally form the indicator thereon. However, it is also contemplated to carry out processing of the functional components in order to form the indicator.

The dimensioning of the indicator, in the sense that it is damaged, i.e. deformed or destroyed, when a predetermined loading limit is reached, takes place in advance on the basis of the available data for the functional component, the service life of which is already predefined on the basis of various loading parameters.

The indicator, as an example the specified fin, can certainly also be implemented with a different design. In this respect, a spring element, clamped-in wire or the like or a piece of sheet metal which is integrally cast in or connected in a positively locking fashion are possible.

Furthermore, DU bearings, with embedded contacts, which interrupt, for example, a potential signal given corresponding wear, can serve as indicators.

The abovementioned roller bearings, usually needle bearings, which pivotably support the brake lever are embodied in such a way that a needle is provided with at least one notch or a reduced length as an indicator.

Widening of the brake caliper, such as typically occurs, can be tapped by way of a pad retaining clip, which spans the mounting opening of the brake caliper, and determined in this way.

In any case, it is ensured that only functional components, and as a result only a disc brake, which correspond to the safety-relevant requirements, are re-used.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
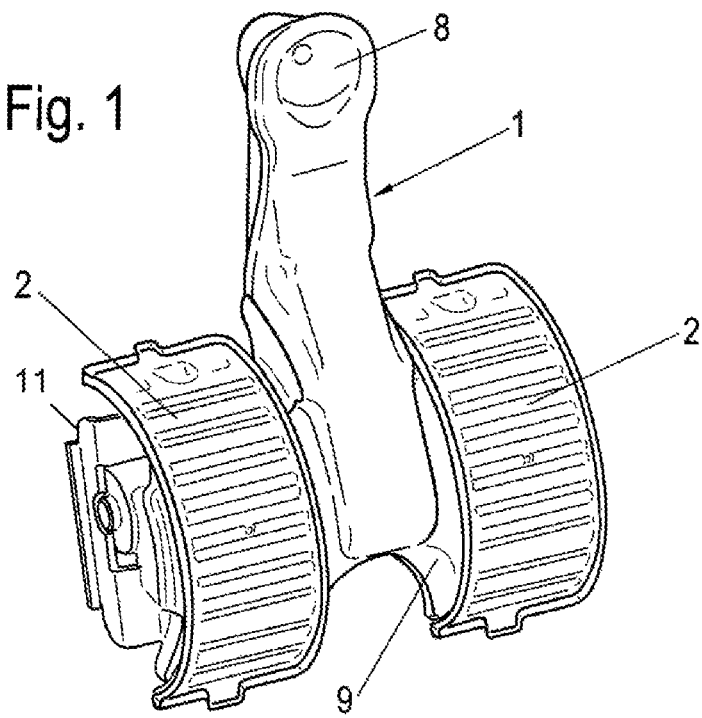
FIG. 1 shows a brake lever as a detail in a perspective view.

FIG. 1 illustrates a brake lever 1 of a disc brake which can be activated pneumatically or by electric motor and is embodied as an eccentric lever. The lever 1 has a receptacle 8, which is trough-shaped at the free end, upon which a plunger of a brake cylinder acts functionally.

The opposite end of the lever 1 from the receptacle 8 is embodied as an eccentric 9, which is supported, on the one hand, on a displaceable bridge 11, which is arranged in the interior of a brake caliper 7 of the disc brake, and, on the other hand, on the brake caliper 7 by way of roller bearings 2.

In the example shown, the roller bearings 2 form generic functional components, wherein they are embodied as needle bearings, with needles 3 which are held in a cage 6.

According to the invention, the functional component, that is to say the roller bearing 2, is equipped with at least one indicator 4. The service life of the indicator 4, which is conditioned by operation, is shorter than that of the roller bearing 2.

For this purpose, the indicator 4, which is in the form of a needle, comparable to those which serve as roller bearings, has a circumferential notch 5, as a result of which damage occurs to the indicator 4, extending as far as a fracture, when a predetermined loading time is exceeded.

It is essential here that the service life of the indicator 4, which is conditioned by operation, is shorter than that of the roller bearings, i.e. of the needles.

Figure 2:
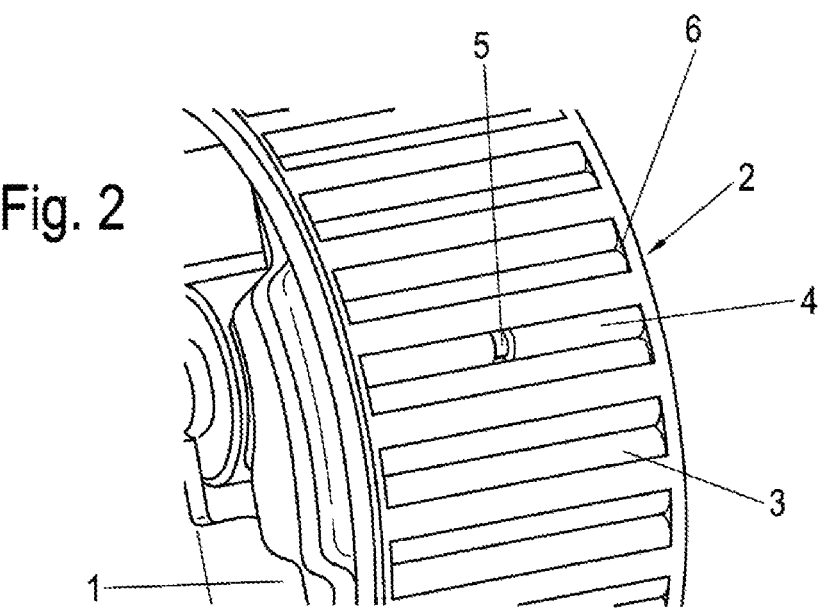
FIG. 2 shows a detail of the brake lever, also illustrated in a perspective view.

The formation of the indicator 4 in the region of the roller bearing 2 is illustrated particularly clearly in FIG. 2, which represents an enlarged detail from FIG. 1.

Figure 3:
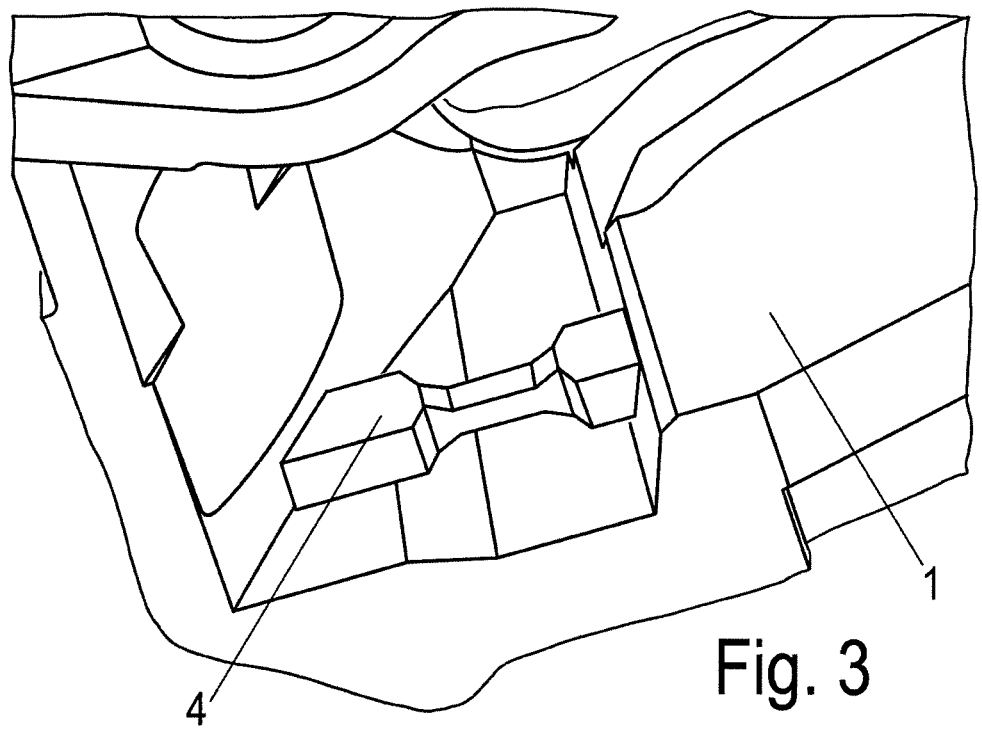
FIG. 3 shows a detail of a brake caliper of a disc brake in a figurative illustration.

In FIG. 3, a detail of a brake caliper 7 of a disc brake is represented with a bone-shaped indicator 4, i.e. with two thickened ends, which are connected to one another by a web which has a smaller cross section in comparison.

Depending on the loading of the brake caliper 7, the indicator 4 is deformed or destroyed, before the brake caliper 7 is damaged to an unusable extent.

Figure 4:
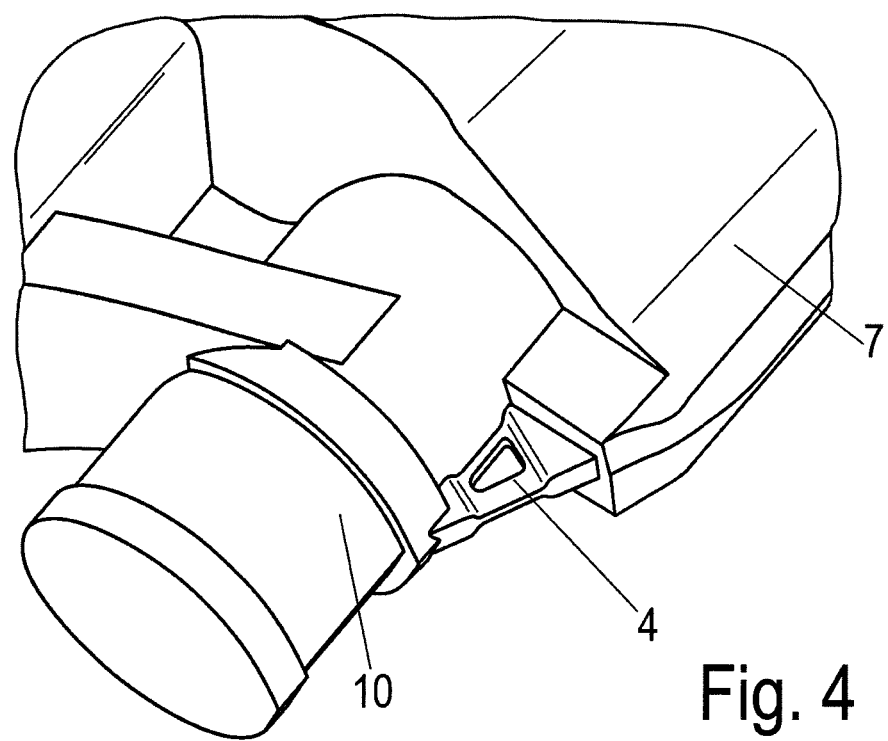
FIG. 4 shows a further detail of the brake caliper, also in a perspective view.

A further example of an indicator 4 is shown in FIG. 4, which represents a detail of the brake caliper 7 in the region of a connecting piece 10 of a sliding bearing in which a guide element, connected to a vehicle-side brake carrier, is mounted. In this context, the indicator 4 is configured in the manner of a bracket, having three limbs which form the edge region, resulting in a triangular contour and bound a free internal space.

Depending on the loading which is taken up, the indicator 4 is also deformed or destroyed over time, with the result that after removal of the brake caliper 7 it is apparent whether reuse is possible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake, comprising:
    at least one functional component that is reusable after use and subsequent examination for operational safety, the at least one safety-relevant functional component including a brake lever, a bridge or a caliper,
    wherein
        the at least one safety-relevant functional component is equipped with at least one indicator,
        the indicator has an operation-related service life that is shorter than a safety-relevant range of the functional component, when the indicator is in a roller bearing of a brake lever, said indicator is embodied as a rolling body provided with a notch, and
the indicator is held, with the rest of the rolling body of the roller bearing, in a cage.

2. The disc brake as claimed in claim 1, wherein
the indicator is embodied as a connected fin or web on a brake caliper, a brake lever or on another functional component of the disc brake.

3. The disc brake as claimed in claim 1, wherein
the indicator is integrally cast on in a case of a cast functional component.

4. The disc brake as claimed in claim 1, wherein
the indicator is attached by machining.

5. The disc brake as claimed in claim 1, wherein
the indicator, which is arranged on a brake caliper, is embodied as a bracket with a triangular contour, having limbs bounding a free internal space.

6. The disc brake as claimed in claim 1, wherein
the indicator of a brake caliper is embodied in a bone shape, with two thickened ends and a web which has a smaller cross section in comparison.

7. The disc brake as claimed in claim 1, wherein
the indicator is formed from a piece of sheet metal which is integrally cast in or connected in a positively locking fashion.

8. The disc brake as claimed in claim 1, wherein
the indicator is composed of a DU bearing which is provided with a contact.

* * * * *